United States Patent
Pakzad et al.

(10) Patent No.: US 9,116,000 B2
(45) Date of Patent: Aug. 25, 2015

(54) MAP-ASSISTED SENSOR-BASED POSITIONING OF MOBILE DEVICES

(71) Applicant: QUALCOMM Incorporated, San Diego, CA (US)

(72) Inventors: Payam Pakzad, Mountain View, CA (US); Sameera Poduri, Santa Clara, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 0 days.

(21) Appl. No.: 13/657,428

(22) Filed: Oct. 22, 2012

(65) Prior Publication Data

US 2014/0114561 A1 Apr. 24, 2014

(51) Int. Cl.
G01C 21/14 (2006.01)
G01C 21/20 (2006.01)
G01C 22/00 (2006.01)

(52) U.S. Cl.
CPC .............. *G01C 21/14* (2013.01); *G01C 21/206* (2013.01); *G01C 22/006* (2013.01)
USPC ....................................................... 701/410

(58) Field of Classification Search
CPC ..... G01C 21/14; G01C 21/206; G01C 22/006
USPC ....................................................... 701/410
See application file for complete search history.

(56) References Cited

U.S. PATENT DOCUMENTS

| | | | |
|---|---|---|---|
| 6,581,000 B2 | 6/2003 | Hills et al. | |
| 7,236,091 B2 | 6/2007 | Kiang et al. | |
| 7,496,445 B2 | 2/2009 | Mohsini et al. | |
| 7,522,999 B2 | 4/2009 | Wence et al. | |
| 2009/0005975 A1 | 1/2009 | Forstall et al. | |
| 2009/0043504 A1 | 2/2009 | Bandyopadhyay et al. | |
| 2012/0203453 A1* | 8/2012 | Lundquist et al. | 701/434 |
| 2013/0191019 A1* | 7/2013 | Pakzad | 701/454 |

FOREIGN PATENT DOCUMENTS

| | | |
|---|---|---|
| WO | WO-2004077374 A1 | 9/2004 |
| WO | WO-2012009328 A1 | 1/2012 |

OTHER PUBLICATIONS

Fan Li, Chunshui Zhao, Guanzhong Ding, Jian Gong, Chenxing Liu, Feng Zhao "A Reliable and Accurate Indoor Localization Method Using Phone Inertial Sensors" Sep. 5-8, 2012, Proceedings of the 2012 ACM Conference on Ubiquitous Computing, ACM New York, NY, USA, pp. 421-430, ISBN 978-1-4503-1224-0.*

(Continued)

*Primary Examiner* — Mary Cheung
*Assistant Examiner* — Brian P Sweeney
(74) *Attorney, Agent, or Firm* — Berkeley Law & Technology Group, LLP

(57) ABSTRACT

Various methods, apparatuses and/or articles of manufacture are provided which may be implemented to estimate a trajectory of a mobile device within an indoor environment. In some embodiments, the trajectory may be estimated without the use of any signal-based positioning information. For example, a mobile device may estimate such a trajectory based, at least in part, on one or more sensor measurements obtained at the mobile device, and further affect the estimated trajectory based, at least in part, on one or more objects identified in an electronic map of the indoor environment.

42 Claims, 10 Drawing Sheets

(56) References Cited

OTHER PUBLICATIONS

Avinash Parnandix, Ken Ley, Pradeep Vaghelay, Aalaya Kollix, Karthik Dantuy, Sameera Poduriy, Gaurav S. Sukhatmey, "Coarse In-building Localization with Smartphones" 2009, MobiCASE San Siego, CA.*

International Search Report and Written Opinion—PCT/US2013/063756—ISA/EPO—Jan. 2, 2014.

Qualcomm Incoroprated, Written Opinion of the International Preliminary Examining Authority, Application No. PCT/US2013/063756, Filed Oct. 8, 2013, Mailed Jan. 29, 2015, 8 Pages.

Qualcomm Incoroprated, Amendment Under Article 34, Application No. PCT/US2013/063756, Filed Aug. 22, 2014, 13 Pages.

* cited by examiner

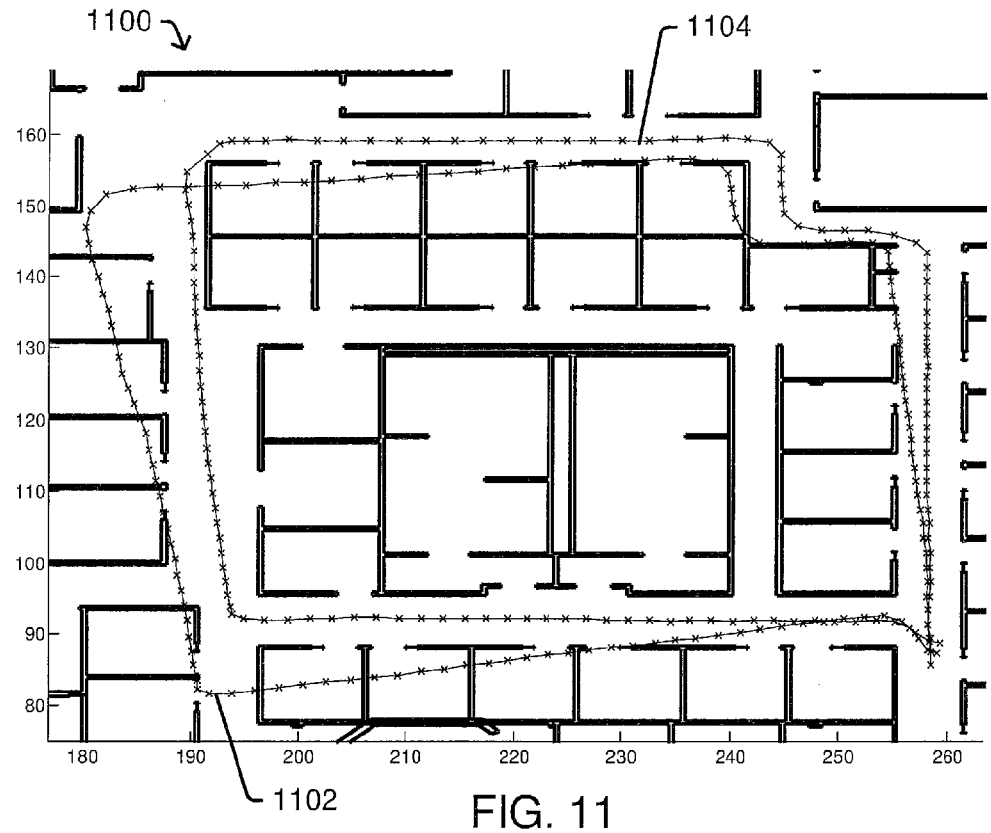
FIG. 11
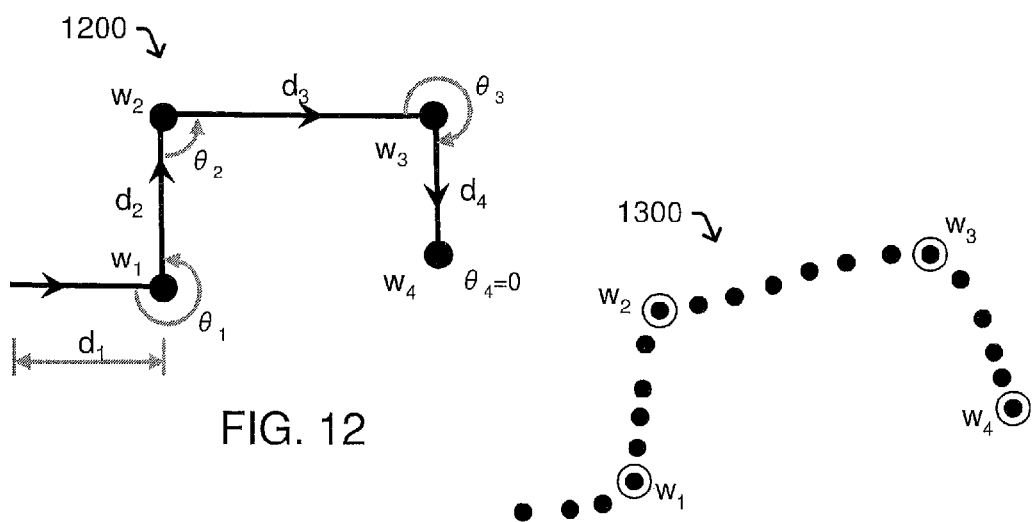
FIG. 12
FIG. 13

MAP-ASSISTED SENSOR-BASED POSITIONING OF MOBILE DEVICES

FIELD

The subject matter disclosed herein relates to electronic devices, and more particularly to methods, apparatuses and articles of manufacture for use in one or more computing platforms to provide or otherwise support map-assisted sensor-based positioning of one or more mobile devices.

BACKGROUND

Mobile devices, such as mobile phones, notebooks, computers, etc., typically have the ability to estimate location and/or position with a high degree of precision using any one of several technologies such as, for example, satellite positioning systems (e.g., GPS and the like), advanced forward-link trilateration (AFLT), just to name a few examples of signal-based positioning systems and/or corresponding signals. Using high precision location information, applications for a mobile device may provide a user with many different services such as, for example, vehicle/pedestrian navigation, location-based searching, just to name a couple of examples. Here, high precision signal-based location information (e.g., obtained from GPS and/or other signal-based positioning systems) may be processed according to a global coordinate system (e.g., latitude and longitude or earth-centered xyz coordinates). While such use of signal-based location information referenced to a global coordinate system may be useful in providing some services (e.g., outdoor vehicle navigation), such signal-based location information referenced to a global coordinate system may be impractical for other types of services such as indoor pedestrian navigation.

In certain indoor environments, such as office buildings, shopping malls, airports, stadiums, etc., certain example signal-based positioning techniques may make use of various terrestrial-based wireless signal transmitting devices, e.g., wireless network access points, cellular network base stations, special-purpose beacon transmitters, etc., that transmit wireless signals which may be received by the mobile device and used for positioning purposes. For example, a mobile device may receive a signal-based positioning signal from a transmitter and based thereon determine a pseudorange between the transmitter and receiver. Hence, for example, positioning may be provided based on trilateration and/or other known signal-based positioning techniques. However, not all indoor environments may be adequately supported by signal-based positioning systems. Moreover in certain instances, it may be beneficial for a mobile device to avoid using signal-based positioning techniques.

SUMMARY

Various methods, apparatuses and/or articles of manufacture are provided which may be implemented to estimate a trajectory of a mobile device within an indoor environment.

For example, in accordance with certain aspects a method may be implemented which comprises, with at least one computing platform: estimating a trajectory of a mobile device within an indoor environment based, at least in part, on one or more sensor measurements obtained at the mobile device; and affecting the estimated trajectory based, at least in part, on one or more objects identified in an electronic map of the indoor environment.

In accordance with certain further aspects, an apparatus may be provided which comprises: means for estimating a trajectory of a mobile device within an indoor environment based, at least in part, on one or more sensor measurements obtained at the mobile device; and means for affecting the estimated trajectory based, at least in part, on one or more objects identified in an electronic map of the indoor environment.

In accordance with still other aspects, a computing platform may be provided which comprises: memory; and one or more processing units to: estimate a trajectory of a mobile device within an indoor environment based, at least in part, on one or more sensor measurements obtained at the mobile device; and affect the estimated trajectory based, at least in part, on one or more objects identified in an electronic map of the indoor environment accessible via the memory.

In accordance with yet another aspect, non-transitory computer readable medium having stored thereon computer implementable instructions executable by one or more processing units in a computing platform to: estimate a trajectory of a mobile device within an indoor environment based, at least in part, on one or more sensor measurements obtained at the mobile device; and affect the estimated trajectory based, at least in part, on one or more objects identified in an electronic map of the indoor environment.

BRIEF DESCRIPTION OF DRAWINGS

Non-limiting and non-exhaustive aspects are described with reference to the following figures, wherein like reference numerals refer to like parts throughout the various figures unless otherwise specified.

FIG. 11 is a diagram illustrating a visual representation of certain objects identified in an electronic map of an indoor environment, and an overlay depicting an initial route based on initial trajectory data and a further adjusted route based on the initial trajectory data adjusted based, at least in part, on one or more of the objects identified in the electronic map, in accordance with an example implementation.

FIG. 12 is a diagram illustrating a visual representation of a route having changing trajectories that lead through a sequence of waypoints, in accordance with an example implementation.

FIG. 13 is a diagram illustrating a visual representation of steps taken by a person following a route as in FIG. 12, in accordance with an example implementation.

DETAILED DESCRIPTION

Figure 1:
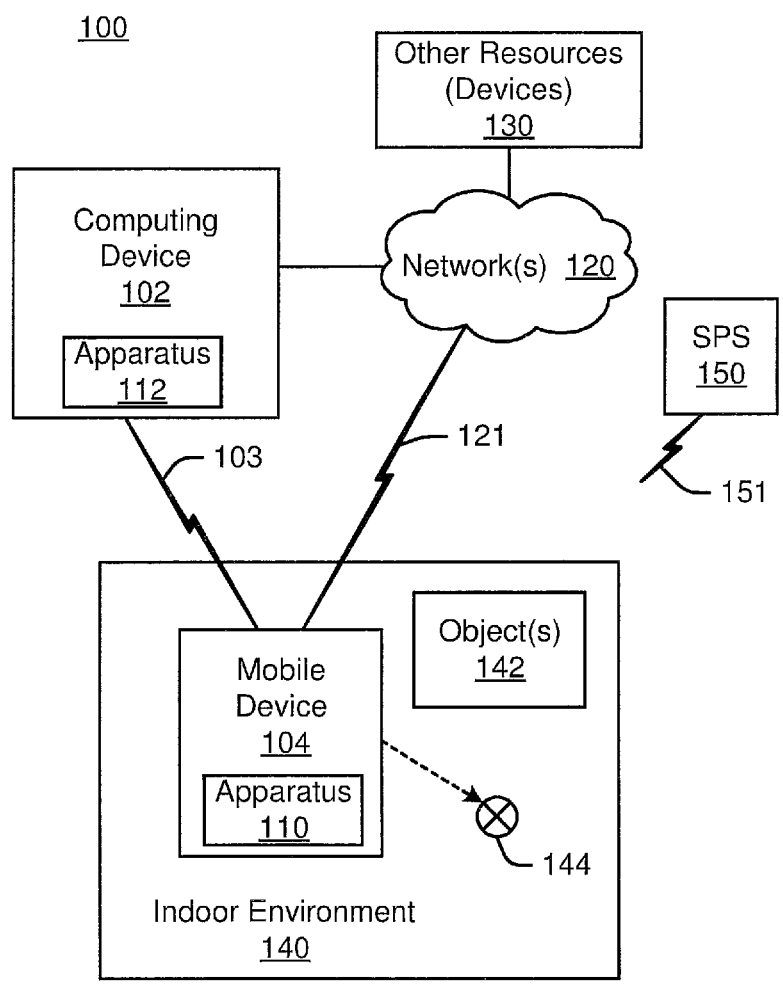
FIG. 1 is a schematic block diagram illustrating an example environment that includes a computing device and a mobile device, one or more of which may support map-assisted sensor-based positioning of the mobile device, in accordance with an example implementation.

As illustrated by the examples herein, various methods, apparatuses and articles of manufacture may be implemented for use in one or more computing platforms to provide or otherwise support map-assisted sensor-based positioning of one or more mobile devices.

In accordance with certain aspects, the techniques provided herein for map-assisted sensor-based positioning may be of particular benefit within an environment wherein certain signal-based positioning techniques may not be supported and/or may be adverse for some reason. For example, in certain indoor environments signal-based positioning techniques that rely on SPS signals may not function well due to additional signal attenuation, etc. Additionally, certain indoor environments may lack access points and/or other wireless transmitters that might otherwise be useful in certain signal-based positioning techniques. Furthermore, in certain instances, it may be desirable for a mobile device to avoid transmitting and/or receiving wireless signals, including those which might be used by such signal-based positioning techniques. For example, a mobile device may reduce power consumption by reducing how often a communication interface or portion thereof is operated. In another example, in certain environments it may be beneficial for a mobile device to not activate all or part of its communication interface, e.g., to avoid interfering with other electronic devices, and/or for other reasons. In some circumstances, certain other benefits of processing without use of wireless signaling may be achieved, such as, e.g., information may be obtained (e.g., new, updated, etc.) and/or applied (e.g., used, tested, verified, etc.) which corresponds to a ground truth and/or the like for a given environment. Hence, such new and/or refined information may be beneficial to various other processes that are used to map or otherwise identify certain features within the environment or a portion thereof. Thus, such new and/or refined information may, for example, be applied in one or more systems or capabilities provided for post-processing and/or post-positioning use.

Thus, it may be beneficial, at times, for a mobile device to obtain sensor measurements from one or more onboard sensors, e.g., inertial sensors, environmental sensors, and/or the like or some combination thereof, which may not consume as much power as certain communication interfaces and/or interfere with other devices. In certain instances, sensor measurements may be used to estimate a trajectory and/or a position of the mobile device within a particular environment. For example, sensor measurements from one or more inertial sensors (e.g., one or more accelerometers, a gyroscope, etc.) and/or one or more environmental sensors (e.g., a magnetometer or other like device, for example a barometer) may correspond to certain movements experienced by a mobile device as it is moved about by its user while navigating within a particular environment. For example, one or more accelerometers may generate sensor measurements based on forces experienced by a mobile device as its user is taking steps while walking or running. For example, one or more accelerometers may generate sensor measurements based on forces experienced by a mobile device as its user accelerates, decelerates, turns, etc. For example, a gyroscope may generate sensor measurements corresponding to changes in an orientation of the mobile device as its user navigates amongst various objects within a particular environment. For example, a magnetometer may generate sensor measurements corresponding to certain directional changes made by a user moving about, e.g., turning while walking, pivoting while standing, etc. For example, in certain instances a barometer may generate sensor measurements corresponding to certain changes in altitude made by a user moving about, e.g., climbing stairs, riding in an elevator or on an escalator, etc.

In addition to comprising one or more sensors, a mobile device may be further provisioned with all or part of one or more electronic maps which may indicate certain objects within an environment that have some effect on a persons ability to move about within the environment. By way of example, an electronic map for an indoor environment (e.g., comprising all or part of one or more natural and/or man-made structures) may identify various objects relating to the indoor environment. For example, an electronic map for a building may identify various regions within the building that are separated by walls and/or other like physical features. Hence, an example electronic map for a building may comprise a computer aided design (CAD) drawing and/or the like which identifies a floor plan having various rooms, hallways, entry ways, exit ways, staircases, elevators, windows, etc. In certain instances, an example electronic map may further indicate certain objects such as, e.g., desks, cubicles, display cases, appliances, etc. In still other instances, one or more data files associated with an example electronic map may comprise additional information that may be of use to a user navigating within an indoor structure. For example, location based service information and/or some form of metadata may be provided which indicates certain services, or possibly a person or entity that might be associated with a particular region within an indoor structure. Those of skill in the art will appreciate that objects other than those described above may be identified in the electronic map. Further, those of skill in the art will appreciate that the electronic map may be provisioned at a device or location other than the mobile device, for example at a server or workstation, and that the electronic map may describe areas other than indoor areas. For example, the electronic map may describe an open air stadium or path-ways within a city or park. Thus, although embodiments below may be described with respect to an indoor environment and/or map, certain embodiments may be used within other environments or with other electronic maps.

In certain implementations, it may be possible for a user and/or some other entity to provide additional information that may relate to and/or otherwise be used to annotate or otherwise enhance part of an electronic map or some data file associated there with. For example, in certain implementations one or more applications may be provided which allow a user or some other entity to define one or more starting and/or ending locations, and/or waypoints, which may be associated with one or more planned routes that a user may follow in whole or in part within an indoor environment. For example, an application may be provided to accept user inputs (e.g., by way of one or more buttons and knobs, a keypad, a touch screen, a microphone, a camera, etc.) with regard to a display of information within a displayed map rendering and/or associated with an electronic map. Thus, for example, a user may be presented with a list of people or points of interest, or possibly a visual representation of all or part of a floor plan, etc., and may respond in some manner to program a desired starting and/or ending point and/or one or more waypoints, and/or the like. In certain example implementations, a mobile device may obtain routing directions to a particular destination (e.g., from an onboard and/or external service application, etc.). Assuming that the user of the mobile device follows such routing directions, one or more waypoints may be determined based, at least in part, on such routing directions.

One or more data files representing an electronic map and/or other like information and/or computer implementable instructions may, for example, be obtained from one or more other computing devices (e.g., over one or more wired and/or wireless communication links), and/or obtained from various forms of non-transitory computer readable media (e.g., an optical disc, a magnetic disk, an electronic memory device, a machine-readable object, etc.).

In accordance with certain example implementations, one or more computing platforms may be provided, e.g., within a computing device and/or a mobile device, to estimate a trajectory of a mobile device within an indoor environment based, at least in part, on one or more sensor measurements obtained at the mobile device, and affect the estimated trajectory based, at least in part, on one or more objects identified in an electronic map of the indoor environment.

In an example implementation, a computing platform may estimate a trajectory of a mobile device by detecting an occurrence of at least one action associated with a motion mode based, at least in part, on at least one of the one or more sensor measurements obtained from at least one accelerometer at the mobile device. By way of example, an example motion mode may relate to one or more forms of bipedal movement, such as, may be experienced by a mobile device carried by a person that is walking or running, etc. In another example, a particular motion mode may relate to movements that a mobile device may experience while being carried by person that is riding in an elevator or on an escalator and/or being propelled in some manner.

Based, at least in part, on the occurrence of at least one such detected action, the computing platform may estimate a distance traveled by the mobile device during a period of time, a velocity of the mobile device during the period of time, and/or other like motion related information. By way of example, assuming that the motion mode comprises some form of a bipedal movement mode, the detected action may include one or more stepping actions. As such, the computing platform may, for example, estimate a distance traveled and/or a velocity, based at least in part on an estimated stride length, an estimated stride frequency, and/or the like or some combination thereof associated with the one or more detected stepping actions. In certain example implementations, the computing platform may estimate a distance traveled and/or a velocity by integrating a step count and integrating angular velocities.

In accordance with certain example implementations, a computing platform may estimate a trajectory for a mobile device, at least in part, by determining whether a change in an orientation of the mobile device has or has not occurred based, at least in part, on one or more sensor measurements obtained from a gyroscope and/or a magnetometer at the mobile device. Here, for example, the computing platform may estimate a current heading of the mobile device based, at least in part, on the determination that a change has or has not occurred. For example, a computing platform may estimate a current heading based, at least in part, on at least one previously estimated heading.

In accordance with certain example implementations, a computing platform may affect an estimated trajectory, at least in part, by using one or more locations of one or more waypoints that may be defined with regard to the arrangement of one or more objects within the indoor environment as identified in an electronic map. In certain instances, a computing platform may, for example, obtain at least one of the locations of the waypoints based, at least in part, on at least one input received from a user interface of the mobile device. In certain instances, a computing platform may, for example, determine one or more of the locations for one or more waypoints based, at least in part, on the electronic map.

In accordance with certain example implementations, a computing platform may affect an estimated trajectory, at least in part, by correcting a drift that may occur in the estimated trajectory, and possibly be aggregated over time. For example, in certain implementations a particle filter and/or the like may be implemented to estimate a trajectory and correct for certain errors such as a drift. In certain instances, a particle filter may, for example, maintain a particle state based, at least in part, on an estimated position of the mobile device with respect to the electronic map and/or some object identified therein, an estimated heading of the mobile device, an estimated distance traveled by the mobile device during a period of time, an estimated velocity of the mobile device at some point in time or during a period of time, and/or the like or some combination thereof.

In certain instances, an estimated heading may take into account and/or otherwise be associated with a heading error that is based, at least in part, on an estimated turn characteristic. In certain instances, a particle filter may propagate one or more particles based, at least in part, on one or more sensor measurements obtained at the mobile device. In certain instances, a particle filter may maintain a particle state based, at least in part, on deleting propagated particles that stray from an estimated trajectory and/or other line by more than a threshold measurement.

In accordance with certain example implementations, a computing platform may affect an estimated trajectory, at least in part, by correcting a drift in the estimated trajectory using a discrete turn assignment that may be based, at least in part, on a cost function and/or the like. For example, a cost function may take into account a cost of a difference or lack thereof in an orientation of the mobile device during some period of time, a cost of matching (matching cost) a distance between consecutive waypoints to an estimated distance traveled by the mobile device during some period of time, and/or the like or some combination thereof. In certain instances, a cost function may, for example, be computed, at least in part, using a dynamic function to minimize a matching cost.

In accordance with certain example implementations, a computing platform may estimate a location of the mobile device based, at least in part, on at least a portion of the estimated trajectory and the electronic map. In certain example implementations, a computing platform may, for example, initiate presentation of an estimated location, an estimated trajectory, an estimated time of arrival, an estimated velocity and/or the like or some combination thereof via at least one user output device of the mobile device, and/or possibly some other computing device.

In certain example implementations, an estimated trajectory may be based on multiple potential paths and/or constraints. In some embodiments, for example, an electronic map may be searched (e.g., by way of a cost function, etc.) to determine a most likely path. Accordingly, in certain instances a location of a mobile device may be obtained without the use of wireless signals for positioning. For example, embodiments herein are not limited to a priori knowing an approximate position or first determining an approximate position (or disambiguating between potential positions, for example based on nearby features) of a mobile device, and/or having to follow a particular path. Rather, embodiments may be used in other circumstances, for example when such information is not available or when it is beneficial not to determine or collect this information, to determine a likely route or path within an environment corresponding to an electronic map, for example based on the electronic map (or constraints thereof) and one or more sensors of the mobile device. Thus, a route or position of the mobile device may be inferred in some embodiments even when an approximate position or route of the mobile device within an environment is unknown.

Attention is now drawn to FIG. 1, which is a schematic block diagram illustrating an example environment 100 that includes a computing device 102 and a mobile device 104, one or more of which may support map-assisted sensor-based positioning of mobile device 104, in accordance with an example implementation.

As shown, computing device 102 comprises an apparatus 112 to provide map-assisted sensor-based positioning with regard to mobile device 104 within an indoor environment 140. Apparatus 112 may represent one or more computing platforms that may communicate with one or more other resources (devices) 130, either directly and/or indirectly, e.g. via one or more network(s) 120. Apparatus 112 may communicate with mobile device 104, either directly (e.g., illustrated by wireless communication link 103) and/or indirectly (e.g., via network(s) 120 and illustrated by wireless communication link 121). While computing device 102 happens to be illustrated in this example as being located outside of indoor environment 140, it should be recognized that in certain other implementations, all or part of computing device 102 and/or apparatus 112 may be located within indoor environment 140.

Network(s) 120 may comprise one or more communication systems and/or data networks having various interconnected devices supporting communication between computing device 102 and one or more other resources (devices) 130. As mentioned, network(s) 120 may further support communication between computing device 102 and mobile device 104. For example, communication between computing device 102 and mobile device 104 may allow for certain data and/or instructions to be exchanged there between. In one example, one or more sensor measurements obtained from one or more sensors on board mobile device 104 may be transmitted to apparatus 112 within computing device 102, and/or all or part of an estimated trajectory and/or other positioning information determined, at least in part, by apparatus 110 may be transmitted to computing device 102, and/or possibly one or more other resources (devices) 130. Conversely, in another example, all or part of an estimated trajectory and/or other positioning information determined, at least in part, by apparatus 112 in computing device 102 may be transmitted to mobile device 104.

As used herein a "mobile device" may represent any electronic device that may be moved about, for example either directly or indirectly by a user, within an indoor environment. In some embodiments, the mobile device may be configured to communicate with one or more other devices via one or more wired and/or wireless communication links. Some examples include a cell phone, a smart phone, a computer (e.g., a personal computer such as a laptop computer, tablet computer, a wearable computer, etc.), a navigation aid, a tracking device, a digital book reader, a gaming device, music and/or video player device, a camera, a machine, a robot, etc.

Other resources (devices) 130 may represent one or more computing platforms from which computing device 102 and/or mobile device 104 may obtain certain data files and/or instructions, and/or to which computing device 102 and/or mobile device 104 may provide certain data files and/or instructions. For example, in certain instances, all or part of an electronic map and/or the like may be obtained by computing device 102 and/or mobile device 104 from one or more other resources (devices) 130. For example, in certain instances, all or part of a set of instructions for use in apparatus 112 and/or apparatus 110 may be obtained from other resources (devices) 130.

Example environment 100 further includes a satellite positioning system (SPS) 150 which may transmit one or more SPS signals 151 to mobile devices 104 in some embodiments. SPS 150 may, for example, represent one or more GNSS, one or more regional navigation satellite systems, and/or the like or some combination thereof. Additionally, SPS 150 and/or SPS signals 151 may represent one or more terrestrial-based wireless transmitting devices that transmit wireless signals for use in signal-based positioning. Thus for example, SPS 150 may represent a wireless access point, a base station, etc., and SPS signals 151 may represent a corresponding wireless signal for use in signal-based positioning. SPS signals 151 may, at times, be acquired by a mobile device 104 and used to estimate a position location of the mobile device.

However, as mentioned however, in certain instances, all or part of an indoor environment may be outside of the coverage area for such signal-based positioning signals, and/or mobile device 104 may be operating in a mode wherein such signal-based positioning signals may not be receivable or may be ignored. Thus, in the absence of such signal-based positioning signals, apparatus 110 and/or apparatus 112 may attempt to perform map-assisted sensor-based positioning accordance with the example techniques provided herein.

Indoor environment 140 may represent all or part of one or more indoor environments associated with one or more natural and/or man-made structures. As shown, indoor environment 140 may comprise one or more objects 142 which may affect in some manner the movement of a user with mobile device 104. Further, as shown, all or part of mobile device 104 may have an actual physical location 144 within indoor environment 140 which may correspond to an estimated location that may be determined with regard to all or part of an electronic map associated with indoor environment 140.

Figure 2:
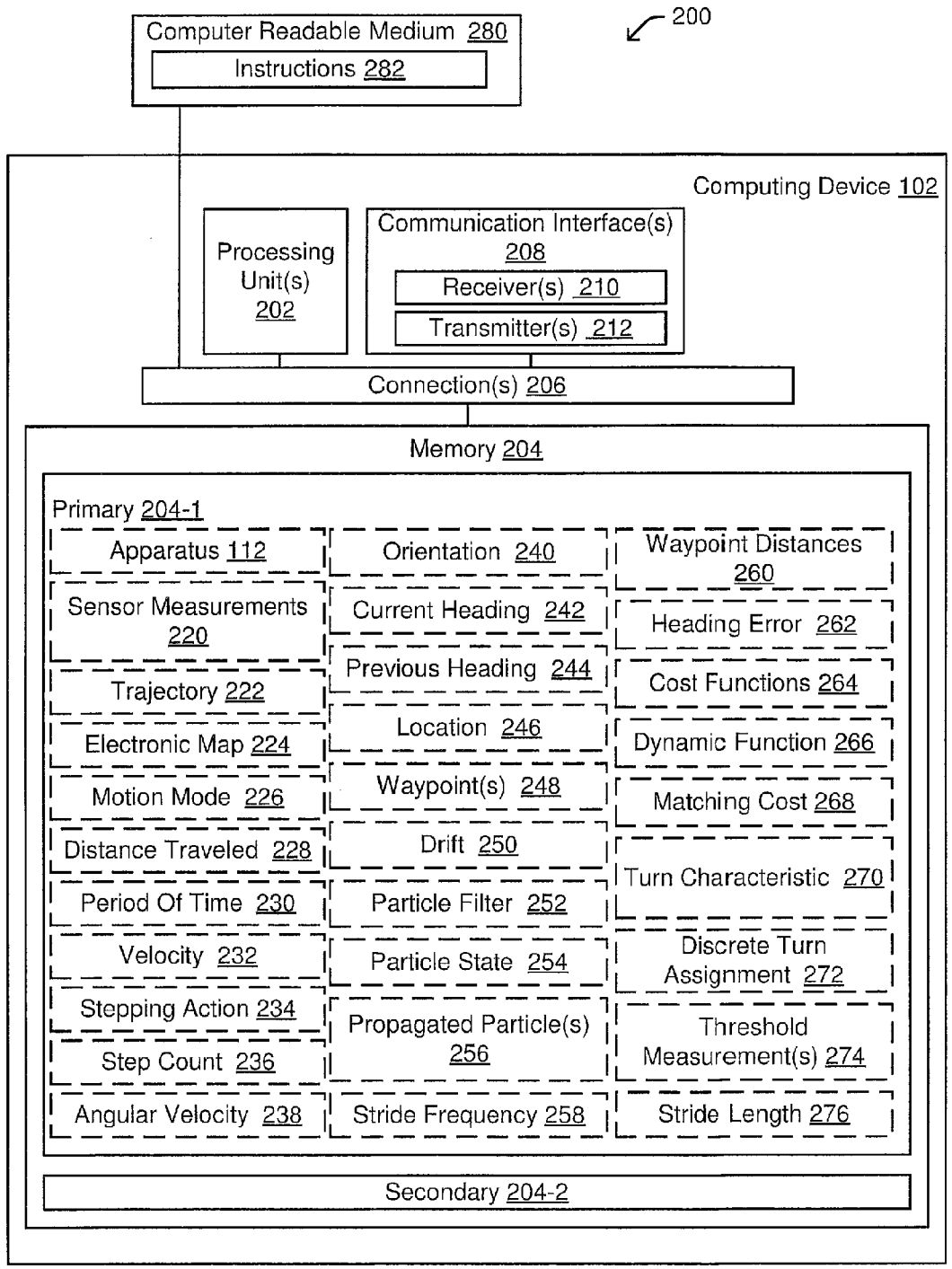
FIG. 2 is a schematic block diagram illustrating certain features of an example computing platform in a computing device to support map-assisted sensor-based positioning of a mobile device, in accordance with an example implementation.

Attention is drawn next to FIG. 2, which is a schematic block diagram illustrating certain features of an example computing platform 200 in a computing device 102 to support map-assisted sensor-based positioning of a mobile device, in accordance with an example implementation.

As illustrated computing platform 200 may comprise one or more processing units 202 to perform data processing (e.g., in accordance with the techniques provided herein, as part of apparatus 112, etc.) coupled to memory 204 via one or more connections 206. Processing unit(s) 202 may, for example, be implemented in hardware or a combination of hardware and software. Processing unit(s) 202 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 204 may be representative of any data storage mechanism. Memory 204 may include, for example, a primary memory 204-1 and/or a secondary memory 204-2. Primary memory 204-1 may comprise, for example, a random access memory, read only memory, etc. While illustrated in this example as being separate from the processing units, it should be understood that all or part of a primary memory may be provided within or otherwise co-located/coupled with processing unit(s) 202, or other like circuitry within computing platform 200. Secondary memory 204-2 may comprise, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to, a non-transitory computer readable medium 280. Memory 204 and/or non-transitory computer readable medium 280 may comprise instructions 282 associated with data processing, e.g., in accordance with the techniques and/or example apparatus 112 (FIG. 1) and/or example process 400 (FIG. 4), as provided herein.

Computing platform 200 may, for example, further comprise one or more communication interfaces 208. A communication interface(s) 208 may, for example, provide connectivity to network(s) 120, mobile device 104, and/or other resources (devices) 130 (FIG. 1), e.g., via one or more wired and/or wireless communication links. As illustrated here communication interface(s) 208 may comprise one or more receivers 210, one or more transmitters 212, and/or the like or some combination thereof. Communication interface(s) 208 may implement one or more communication protocols as may be required to support one or more wired and/or wireless communication links.

Processing unit(s) 202 and/or instructions 282 may, for example, provide or otherwise be associated with one or more signals that may be stored in memory 204 from time to time, such as: apparatus 112; one or more sensor measurements 220; one or more estimated trajectories 222; one or more electronic maps 224; a motion mode 226; an estimated distance traveled 228; a period of time 230; an estimated velocity 232; a stepping action 234; a step count 236; an angular velocity 238; an orientation 240; an estimated current heading 242; one or more estimated previous headings 244; one or more estimated locations 246; one or more waypoints 248 (and/or their locations); one or more errors such as drift 250; a particle filter 252; a particle state 254; one or more propagated particles 256; a stride frequency 258; one or more waypoint distances 260; a heading error 262; one or more cost functions 264; a dynamic function 266; a matching cost 268; one or more turn characteristics 270; one or more discrete turn assignments 272; one or more thresholds, such as one or more threshold measurements 274; one or more stride lengths 276; and/or the like or some combination thereof. One or more of the elements illustrated in FIG. 2 may be omitted in some embodiments. For example, one or more of the elements 220-276 may be omitted.

Figure 3:
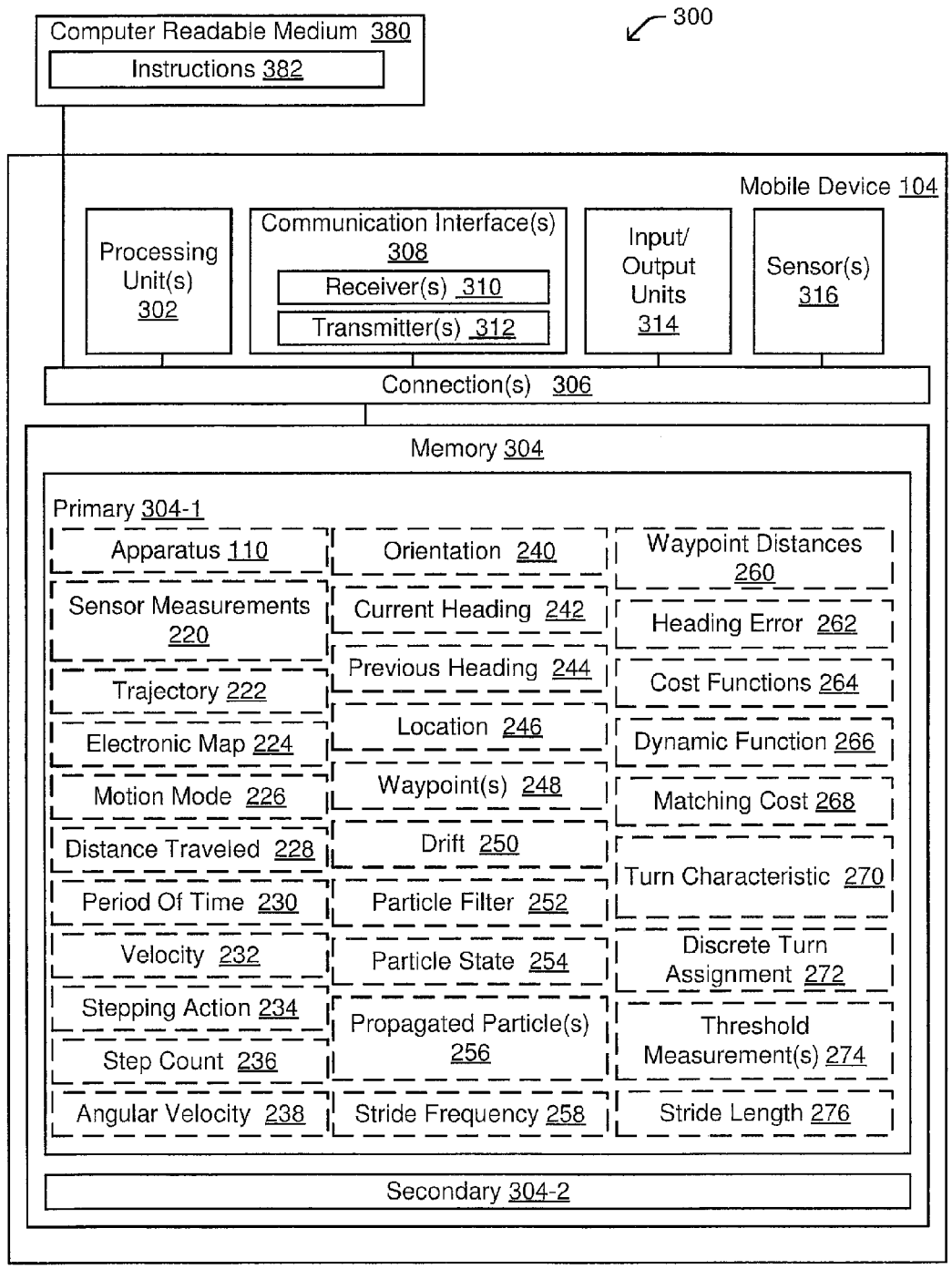
FIG. 3 is a schematic block diagram illustrating certain features of an example computing platform in a mobile device to support map-assisted sensor-based positioning of the mobile device, in accordance with an example implementation.

Attention is drawn next to FIG. 3, which is a schematic block diagram illustrating certain features of an example computing platform 300 in a mobile device 104 to support map-assisted sensor-based positioning of mobile device 104, in accordance with an example implementation.

As illustrated computing platform 300 may comprise one or more processing units 302 to perform data processing (e.g., in accordance with the techniques provided herein, and/or apparatus 110, etc.) coupled to memory 304 via one or more connections 306. Processing unit(s) 302 may, for example, be implemented in hardware or a combination of hardware and software. Processing unit(s) 302 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 304 may be representative of any data storage mechanism. Memory 304 may include, for example, a primary memory 304-1 and/or a secondary memory 304-2. Primary memory 304-1 may comprise, for example, a random access memory, read only memory, etc. While illustrated in this example as being separate from the processing units, it should be understood that all or part of a primary memory may be provided within or otherwise co-located/coupled with processing unit(s) 302, or other like circuitry within mobile device 104. Secondary memory 304-2 may comprise, for example, the same or similar type of memory as primary memory and/or one or more data storage devices or systems, such as, for example, a disk drive, an optical disc drive, a tape drive, a solid state memory drive, etc In certain implementations, secondary memory may be operatively receptive of, or otherwise configurable to couple to, a non-transitory computer readable medium 380. Memory 304 and/or non-transitory computer readable medium 380 may comprise instructions 382 associated with data processing, e.g., in accordance with the techniques and/or example apparatus 110 (FIG. 1) and/or example process 400 (FIG. 4), as provided herein.

Computing platform 300 may, for example, further comprise one or more communication interfaces 308. A communication interface(s) 308 may, for example, provide connectivity to network(s) 120, computing device 102, and/or other resources (devices) 130 (FIG. 1), e.g., via one or more wired and/or wireless communication links. As illustrated here communication interface(s) 308 may comprise one or more receivers 310, one or more transmitters 312, and/or the like or some combination thereof. Communication interface(s) 308 may implement one or more communication protocols as may be required to support one or more wired and/or wireless communication links. Communication interface(s) 308 may, in certain example instances, further comprise one or more receivers capable of receiving SPS signals 152 and/or other signal-based positioning signals, which may, at times, be processed to estimate a location of mobile device 104.

In accordance with certain example implementations, communication interface(s) 208, communication interface(s) 308, and/or other resources in network(s) 120 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 208 and/or communication interface(s) 308 may further provide for infrared-based communications with one or more other devices.

Mobile device 104 may, for example, further comprise one or more input/output units 314. Input/output units 314 may represent one or more devices or other like mechanisms that may be used to obtain inputs from and/or provide outputs to one or more other devices and/or a user of mobile device 104. Thus, for example, input/output units 314 may comprise various buttons, switches, a touch pad, a trackball, a joystick, a touch screen, a microphone, a camera, and/or the like, which may be used to receive one or more user inputs. In certain instances, input/output units 314 may comprise various devices that may be used in producing a visual output, an audible output, and/or a tactile output for a user.

Mobile device 104 may, for example, comprise one or more sensors 316. For example, sensor(s) 316 may represent one or more inertial sensors, one or more environmental sensors, etc., which may be useful in detecting aspects of the environment 100 and/or mobile device 104. Thus for example, sensor(s) 316 may comprise one or more accelerometers, one or one or more gyroscopes or gyrometers, one or more magnetometers and/or the like, one or more barometers, one or more thermometers, etc. Further, in certain instances sensor(s) 316 may comprise one or more input devices such as a microphone, a camera, a light sensor, etc.

Processing unit(s) 302 and/or instructions 382 may, for example, provide or otherwise be associated with one or more signals that may be stored in memory 304 from time to time, such as: apparatus 110; one or more sensor measurements 220; one or more estimated trajectories 222; one or more electronic maps 224; a motion mode 226; an estimated distance traveled 228; a period of time 230; an estimated velocity 232; a stepping action 234; a step count 236; an angular velocity 238; an orientation 240; an estimated current heading 242; one or more estimated previous headings 244; one or more estimated locations 246; one or more waypoints 248 (and/or their locations); one or more errors such as drift 250; a particle filter 252; a particle state 254; one or more propagated particles 256; a stride frequency 258; one or more waypoint distances 260; a heading error 262; one or more cost functions 264; a dynamic function 266; a matching cost 268; one or more turn characteristics 270; one or more discrete turn assignments 272; one or more thresholds, such as one or more threshold measurements 274; one or more stride lengths 276; and/or the like or some combination thereof. While example data and/or instructions as illustrated in FIG. 3 share the same reference numbers as example data and/or instructions as illustrated in FIG. 2, it should be kept in mind that in certain instances all or part of such example data and/or instructions may be distinctly different. One or more of the elements illustrated in FIG. 3 may be omitted in some embodiments. For example, one or more of the elements 220-276 may be omitted.

Figure 4:
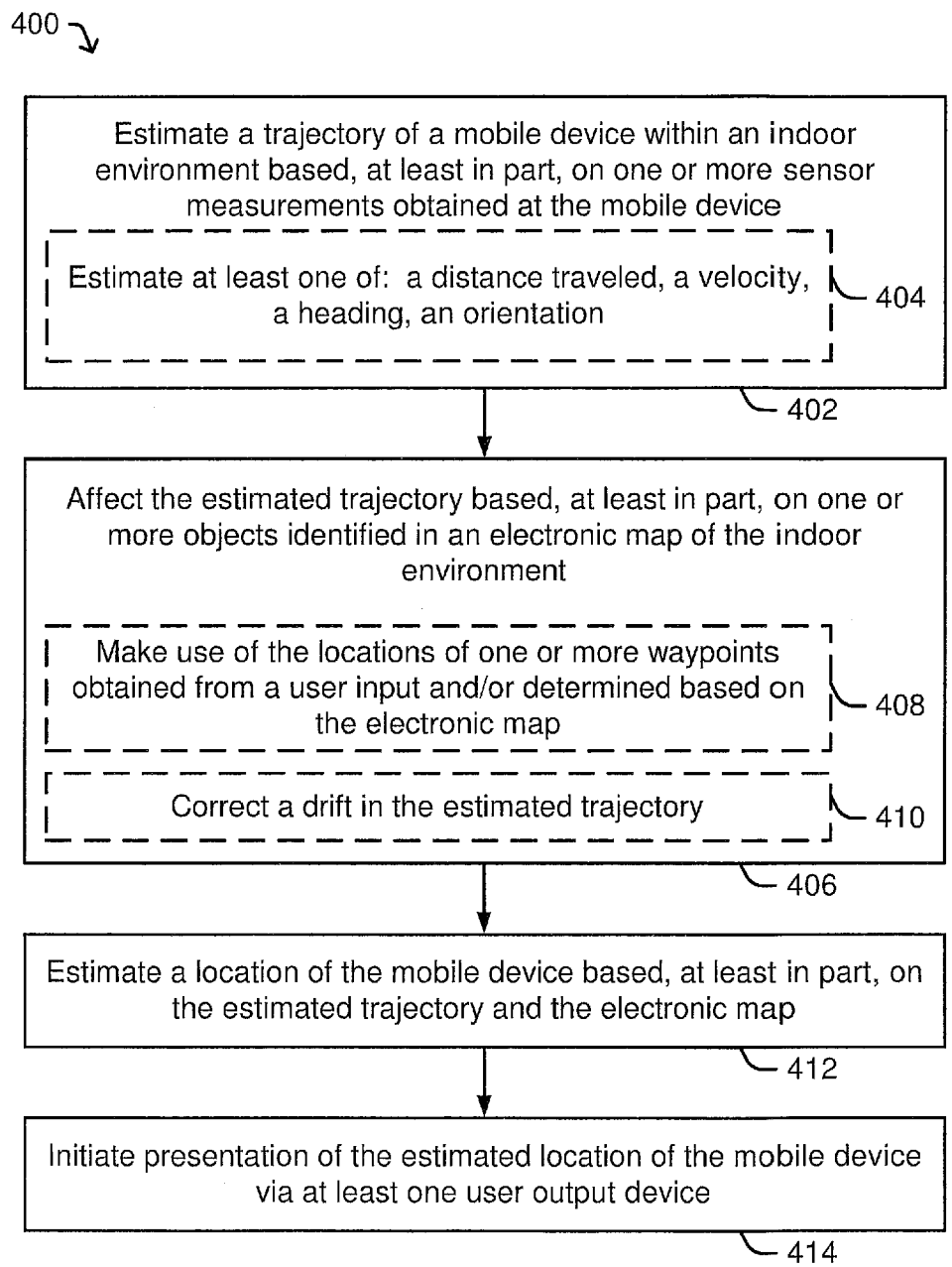
FIG. 4 is a process flow illustrating certain aspects of a process that supports map-assisted sensor-based positioning of a mobile device, in accordance with an example implementation.

Attention is drawn next to FIG. 4, which is an illustrative diagram showing a process 400 for use in one or more computing platforms to support map-assisted sensor-based positioning of a mobile device, in accordance with an example implementation. Process 400 may, for example, be implemented in whole or in-part in apparatus 110 and/or apparatus 112 (FIG. 1), computing platform 200 (FIG. 2), and/or computing platform 300 (FIG. 3).

At example block 402, a trajectory of a mobile device within an indoor environment may be estimated based, at least in part, on one or more sensor measurements obtained at the mobile device. For example, one or more estimated trajectories 222 (see FIG. 2 and FIG. 3) may be determined based, at least in part, on one or more sensor measurements 220 obtained using one or more sensor(s) 316.

In certain instances, at block 404, an estimated distance traveled 228 by the mobile device, an estimated velocity 232 of the mobile device, an estimated current heading 242, an orientation 240, and/or the like or some combination thereof may be determined. For example, in certain implementations a motion mode 226 may be determined which may be indicative of a type of motion determined or otherwise inferred for a mobile device based, at least in part, on one or more sensor measurements 220. For example, in certain implementations a motion mode may indicate that a mobile device is likely being carried by a person who is walking, running, and/or otherwise moving in some indicated manner. Accordingly, in certain implementations a motion mode may correspond to a detected stepping action 234 and/or a stride frequency 258 which may be indicative of a walking or running stride of a person, e.g., determined by one or more characteristics of the detected movements and/or forces observed by one or more sensors 316 on board a mobile device, for example the mobile device 104 and/or as implemented by the computing platform 300. In certain implementations, a step count 236 may be determined, again based on the detected movements and/or forces observed by one or more sensors 316. A particular stepping action and/or step count may correspond to a particular estimated stride length 276 (e.g., a distance between steps), which in turn may be considered in estimating a distance traveled. Similarly, with an estimated distance traveled 228, it may be possible to determine at least an average speed of movement of the mobile device during a period of time 230. Additionally, in certain implementations it may be possible to determine an estimated velocity 232 of the mobile device at a particular time and/or over a particular period of time. Further, in certain implementations, sensor measurements 220 may be used to determine an orientation 240, e.g. corresponding to a trajectory or other estimated motion of the mobile device and/or with regard to the environment. For example, a magnetometer sensor may provide sensor measurements indicative of a particular orientation with regard to a magnetic field of the earth, e.g., magnetic north, south, etc. Likewise, in certain implementations, an angular velocity 238 may be determined or otherwise estimated based on one or more sensor measurements 220. Here, for example, directional changes may be detected by a gyroscope and/or other like inertial sensors, and/or certain other environmental sensors. It should be recognized that, provided applicable sensor measurements 220, and/or with the knowledge of some information regarding previous position and/or trajectory of the mobile device, various positioning and/or movement information regarding the mobile device may be determined or otherwise estimated. Hence, in certain implementations, a current heading 242 of the mobile device may be determined, e.g., based on one or more sensor measurements along with one or more previous headings 244, and/or location 246, etc. For example, in certain implementations a current heading 242 may be indicative of a particular direction relative to some point of reference or system of reference corresponding to the environment and/or the mobile device. For example, a current heading 242 associated with the environment may correspond to a angular direction from magnetic north, etc. For example, a current heading 242 associated with the mobile device may correspond to an angle from an internal reference axis, etc.

It should be kept in mind that, in accordance with certain aspects, the estimations performed at example block 402 and/or at example block 404 may be performed without using signal-based positioning information associated with the mobile device.

At example block 406, at least the estimated trajectory may be affected in some manner based, at least in part, on one or more objects identified in an electronic map of the indoor environment. For example, one or more electronic maps 224 may be indicative of certain areas within the indoor environment through which a person carrying a mobile device may move about in some manner. For example, one or more electronic maps 224 may define certain routes or paths separated by walls or other like objects, entry ways into certain spaces, rooms, staircases, elevators, etc. In certain implementations, one or more electronic maps 224 may comprise a routability graph and/or the like, which may indicate likely or possible routes that may be followed by a person navigating within the indoor environment. For example, a routability graph may include a plurality of nodes relating to particular locations within the indoor environment, along with one or more interconnecting edges leading from one node to the next which may be followed along a particular route or path.

In certain instances, at block 408, one or more locations of one or more waypoints may be used, at least in part, to affect the estimated trajectory. For example, in certain implementations one or more waypoints 248 and/or their locations may be applied to affect the estimated trajectory. In certain instances, one or more locations of one or more waypoints 248 may, for example, be obtained from a user input and/or determined based on all or part of the electronic map. In certain implementations, one or more waypoint distances 260, e.g. a distance to or from/or between waypoints may be taken into consideration. In certain instances, at block 410, one or more errors, such as, a drift 250, a heading error 262, etc., associated with the estimated trajectory may be corrected, at least in part, in affecting the estimated trajectory.

With this in mind, some examples are presented below which allow for one or more errors to be considered in some manner which may affect a particle filter and/or the like which may be used to estimate a trajectory of the mobile device. For example, a particle filter 252 may determine a particle state 254 using one or more propagated particles 256 while taking into consideration one or more errors, such as drift 250, etc. Further, as presented in the examples below, in determining a trajectory of the mobile device an apparatus 110/112 may, for example, apply one or more cost functions 264, a dynamic function 266, a matching cost 268, and/or the like or some combination thereof.

With the techniques provided herein, in certain example implementations one or more turn characteristics 270, one or more discrete turn assignments 272, and/or the like or some combination thereof may be determined and used to affect the estimated trajectory of the mobile device.

Further, at example block 412, a location of the mobile device may be estimated based, at least in part, on the estimated trajectory and the electronic map. At example block 414, a presentation of all or part of the estimated location and/or other estimated positioning information relating to the mobile device may be initiated. Here, for example, a presentation may comprise an audio and/or visual output via at least one user output device. In certain instances, a presentation may comprise transmitting one or more messages to one or more other devices. In a particular example, a person associated with the mobile device may be tracked as they navigate an indoor environment using certain techniques provided herein. For example, a location and/or route/path of a security guard or postman, or possibly a child may be tracked within an indoor environment using techniques such as those presented in process 400. Furthermore, such techniques may also be applied to locating and/or tracking a mobile device is associated with an object that is not person, such as, for example, a container, a machine, etc. In some embodiments, such locating and/or tracking is performed in real-time, for example at the mobile device 104 and/or the computing device 102. In some embodiments, such locating and/or tracking is performed after a route or portion of a route has already been travelled, for example based on data stored in the memory 204 and/or 304. In some embodiments, data stored on a mobile device is analyzed after the mobile device has been transported along a path to determine whether the path is substantially aligned with an expected route.

In some embodiments, one or more of the blocks illustrated in FIG. 4 may be omitted or rearranged. For example, in some embodiments, one or both of the blocks 412 and 414 are omitted. In some embodiments, one or more of block 404, 408, and 410 are instead or in addition omitted.

In some embodiments, one or more of blocks 402, 404, 406, 408, 410, 412, and 414 may be performed or implemented by the processing unit 202 and/or 302, for example in combination with the memory 204 or 304 and/or the computer readable medium 280 or 380. In some embodiments, information and/or measurements may be transmitted from the communication interface 308 at the mobile device 104 and received at the communication interface 208 of the computing device 102, for example such that one or more of the blocks 402, 404, 406, 408, 410, 412, and 414 may be performed at the computing device 102. In some embodiments, such transmission and reception is omitted.

The sections below are intended to present certain example techniques that may be implemented, in whole or in-part, in one or more of an example apparatus 110, example apparatus 112, example computing platform 200, example computing platform 300, and/or as part of an example process 400 or some portion thereof, each of which has been described in the preceding sections.

Example techniques below illustrate certain example algorithms and/or other like implementable techniques that may achieve accurate positioning using consumer-grade or better grade inertial and/or environmental sensors and basic and/or more advanced electronic map information and/or waypoints associated there with.

Most mobile phones and other like mobile devices are now equipped with sensors (e.g., accelerometers, gyroscopes, magnetometers, and/or the like) that may be used to detect motion and hence provide positioning information under certain conditions. In comparison to signal-based positioning techniques, sensor-based positioning in certain implementations may be significantly more energy-efficient. However, in certain instances the corresponding inertial positioning may involve integrating angular velocities and step counts which may result in large drift errors, e.g., possibly due to sensor noise and/or error in estimation of a position of the mobile device and hence sensor(s) with regard to the user's body. For example, certain sensors may generate substantially different sensor measurements for the same user motion depending on the position of the mobile device with regard to the user's body.

In accordance with certain aspects, with regard to an indoor environment positioning, certain example techniques provided herein in may exploit the various objects identified within electronic map of the indoor environment to reduce certain possible drift errors. As previously mentioned, in accordance with certain example implementations various techniques as provided herein may obtain odometry and/or other like information from sensor measurements of one or more sensors on board the mobile device. The techniques may further make use of certain information provided within (and/or otherwise obtained using) one or more electronic maps in an attempt to reduce (e.g., correct for) certain drift errors.

In certain example implementations, electronic map information may comprise a set of waypoints, e.g. in a form of occasional position fixes that may be obtained from a user input, based on certain electronic map information, predetermined as part of a route, and/or possibly identified in the past by one or more other positioning techniques. In accordance with certain implementations, all or part of the techniques provided herein may be implemented in one or more devices that assist one or more other devices, implemented in a single device, implemented for use in stand-alone navigation, implemented for use in providing ground-truth information and/or the like one or more other positioning systems, implemented for one or more other post-positioning or tracking purposes.

In accordance with certain aspects, inertial odometry information may be obtained using one or more sensors. For example, in certain implementations, techniques are provided that may be used to detect a user's steps and/or estimating one or more step lengths, e.g., using sensor measurements from one or more accelerometers. For example, in certain implementations, techniques are provided that may be used to estimate an orientation of a mobile device and/or otherwise identify changes therein, e.g., using one or more gyroscopes and/or one or more magnetometers and/or the like. Further, in accordance with certain example implementations, a matching capability based, at least in part, on an electronic map and/or waypoints relating thereto may be taken into consideration to possibly reduce drift errors. For example, in certain implementations a particle filter and/or other like filter and/or algorithm may be used to implement such a matching capability. In another example, in certain implementations a discrete turn assignment algorithm and/or the like may be used to implement such a matching capability.

In certain example implementations, to estimate a trajectory and/or a position of the mobile device with respect to an indoor environment and/or an electronic map thereof, a computing platform may combine sensor measurements from one or more sensors with information about all or part of a previously traversed path that may be obtained, at least in part, from user input(s). Estimated heading may, for example, be determined based, at least in part, by integrating certain sensor measurements, e.g., such as an adjusted z-axis gyro to determine the z-axis from an expected more steady-state gravitational vector. A step frequency may be estimated, for example, based, at least in part, by sensor measurements obtained from one or more accelerometers. In certain instances, certain sensor measurements that may be useful in estimating a step frequency may or may not be integrated, e.g., depending upon the amount of noise present in the sensor measurements. In certain example implementations, one or more motion motor other like models may be implemented to relate a step frequency (f) and a stride length (l). For example, in certain implementations a stride length l may be determined, at least in part, based on a function such as, $l = k\ f^a$, wherein parameters k and/or a may be estimated (e.g., pre-programmed) and/or may be learned per user over time (e.g., dynamically programmed). In certain example implementations, a plurality of similar functions and/or parameters may be provided for different motion modes. For example, a stride length and/or frequency may differ depending on whether a user is walking or running.

Figure 5:
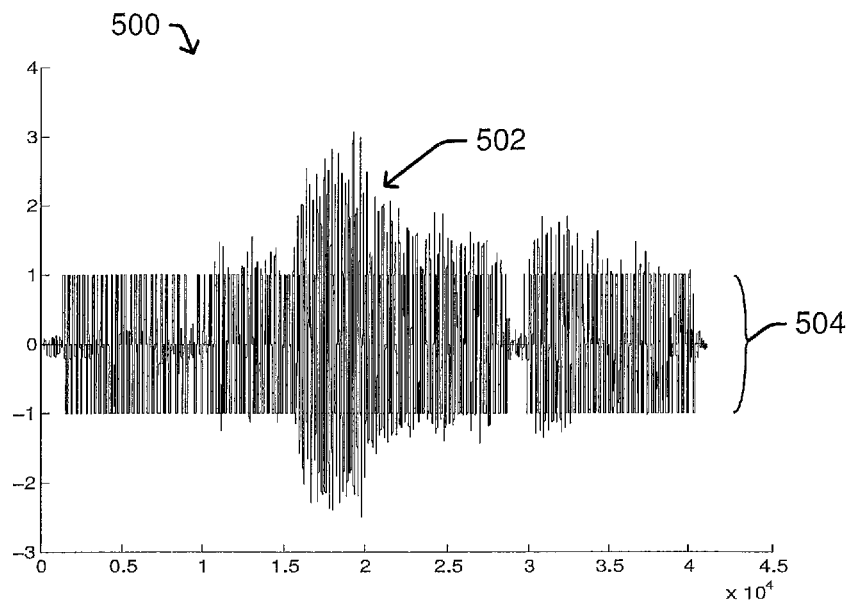
FIG. 5 is a graph illustrating certain step detection data associated with inertial sensor measurements for a person carrying a mobile device while walking or running, in accordance with an example implementation.
Figure 6:
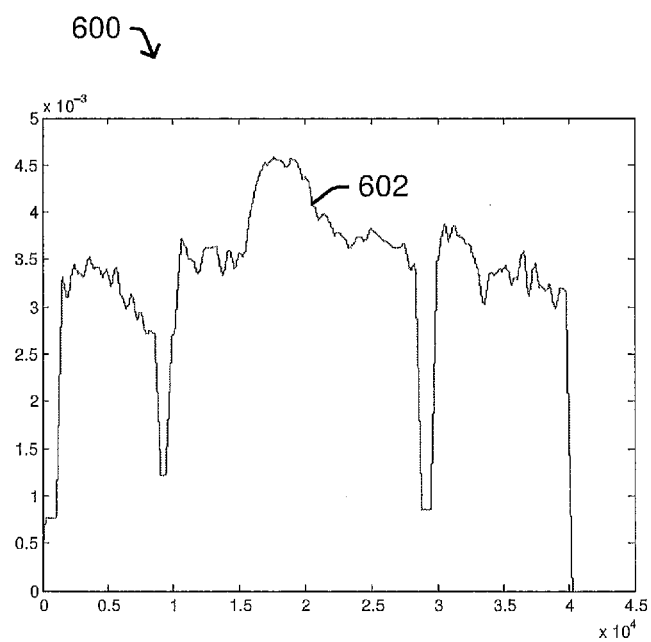
FIG. 6 is a graph illustrating certain step frequency data associated with inertial sensor measurements for a person carrying a mobile device while walking or running, in accordance with an example implementation.

Attention is drawn next to FIGS. 5 and 6, which present example graphs 500 and 600 illustrating plots of example inertial sensor measurements that may be used in determining information associated with some stepping action.

Graph 500, for example, illustrates some sensor measurements that may be used to detect steps. Here, for example, the horizontal axis represents time and the vertical axis represents a magnitude of acceleration (plotted line 502) obtained from an accelerometer after compensating for gravity. This data is passed through a threshold-based filter to detect steps (plotted line 504), where a +1 indicated a stance phase and −1 indicates a swing phase of the walk. A cycle of +1 followed by a −1 is counted as one step.

Graph 600, for example, illustrates the step frequency (plotted line 602) computed from step counts that can, for example, be detected as described in [0071]. The horizontal axis represents time and vertical axis is step frequency, which is the number of steps in fixed time interval, which may, for example, be computed as a moving window average of the number of steps detected.

Figure 7:
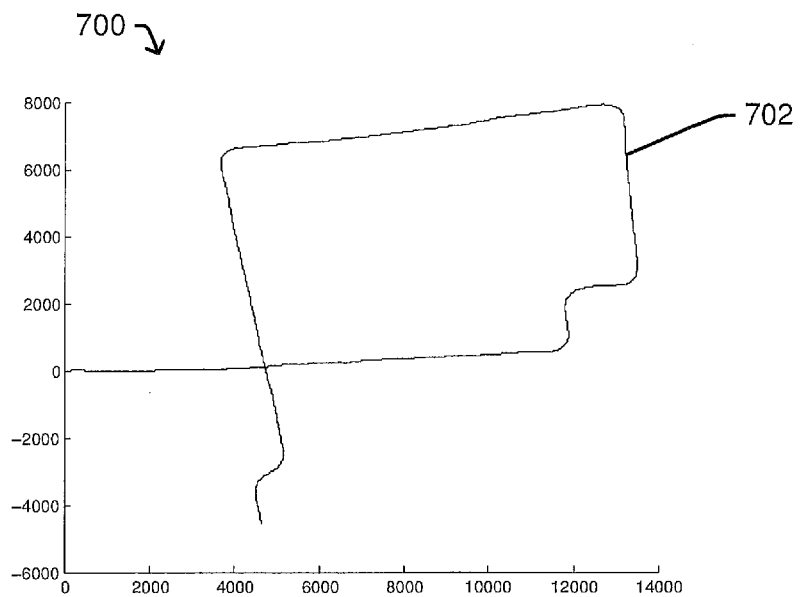
FIG. 7 is a graph illustrating certain angular trajectory data associated with inertial sensor measurements and/or environmental sensor measurements for a person carrying a mobile device while navigating an indoor environment, in accordance with an example implementation.

FIG. 7 shows a graph 700 illustrating a plotted line 702 corresponding to example trajectory estimated from angular orientation information alone, which may be obtained from sensors such as gyroscopes, or magnetometers, or some other source, for a person carrying a mobile device while navigating an indoor environment, in accordance with an example implementation. Here, for example, horizontal and vertical axes may represent the coordinates of estimated position. Note that, since this position estimation does not use any information about distance traveled or linear velocities, the scaling of the trajectory may have a significant error.

Figure 8:
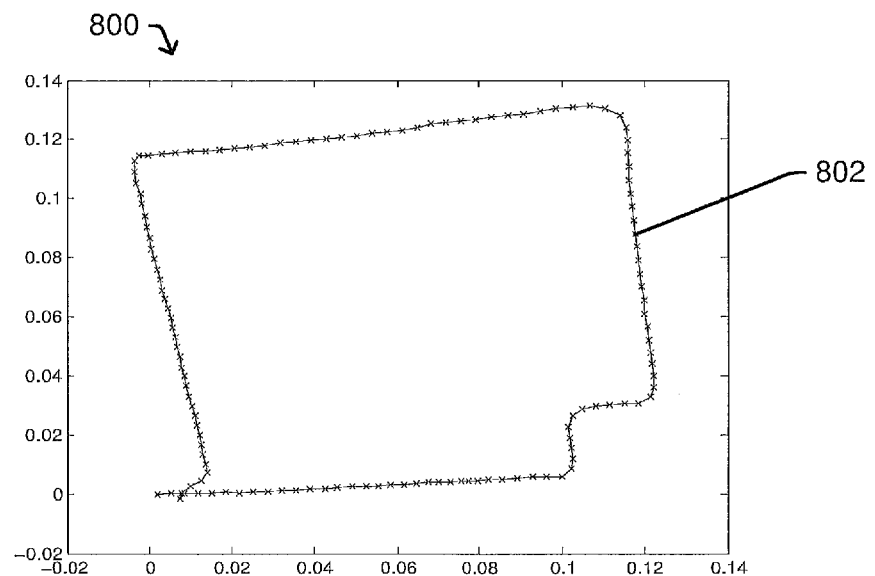
FIG. 8 is a graph illustrating adjusted trajectory data based on the angular trajectory data of FIG. 7 as adjusted based, at least in part, on odometry information, in accordance with an example implementation.

FIG. 8 shows a graph 800 illustrating a plotted line 802 corresponding to an example adjusted trajectory based, at least in part, on the example angular trajectory data of graph 700 as affected based, at least in part, on odometry information and/or the like, in accordance with an example implementation. Here, for example, horizontal and vertical axes may represent the coordinates of estimated position. In this example data, the trajectory shown in graph 700 is corrected for scaling errors using the step frequency computed as shown in graph 600.

Figure 9:
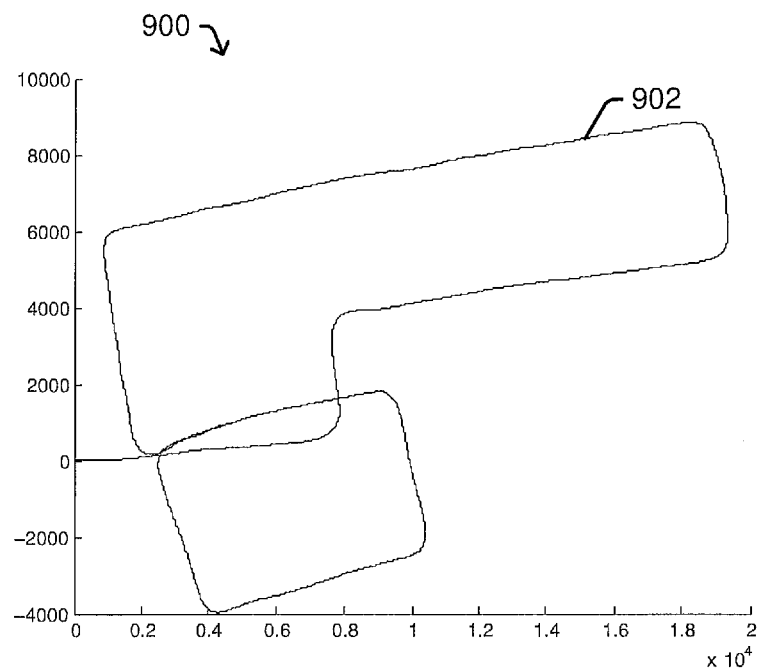
FIG. 9 is a graph illustrating certain angular trajectory data associated with inertial sensor measurements and/or environmental sensor measurements for a person carrying a mobile device while navigating an indoor environment, in accordance with another example implementation.
Figure 10:
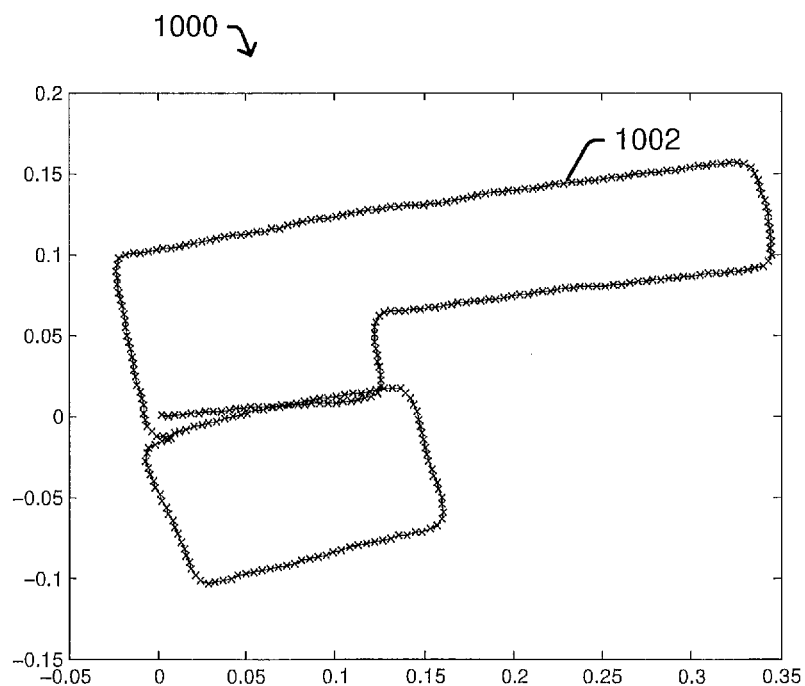
FIG. 10 is a graph illustrating adjusted trajectory data based on the angular trajectory data of FIG. 9 as adjusted based, at least in part, on odometry information, in accordance with an example implementation.

By way of another example, FIG. 9 shows a graph 900 illustrating a plotted line 902 corresponding to certain example angular trajectory data associated with inertial sensor measurements and/or environmental sensor measurements for a person carrying a mobile device while navigating an indoor environment, in accordance with another example implementation. Here, for example, horizontal and vertical axes may represent the coordinates of estimated position. FIG. 10 shows a graph 1000 illustrating an example adjusted trajectory 1002 based, at least in part, on the example angular trajectory data of graph 900 as affecting based, at least in part, on odometry information and/or the like, in accordance with an example implementation. Again, the horizontal and vertical axes may represent the coordinates of estimated position. FIG. 9 and FIG. 10 are similar to FIG. 7 and FIG. 8, but based on a different set of data.

In accordance with certain example implementations, a matching capability may be provided to reduce or otherwise correct errors such as a drift that may occur in a trajectory, and possibly aggregate as result of integrating sensor measurements. In accordance with certain example implementations, one matching capability may make use of the locations of waypoints that may be obtained (e.g., off-line, dynamically, and/or the like or some combination thereof) from electronic map and/or the like, and/or one or more user input(s). In certain example implementations, it should be noted that this example matching capability need not consider timing information, only a sequence of locations of waypoints. As mentioned, in certain implementations, a particle filter and/or the like may be implemented to support and/or otherwise provide a matching capability. In certain other implementations, a discrete turn assignment algorithm and/or the like may be implemented to support and/or otherwise provide a capability.

In certain example implementations in which a particle filter and/or the like may be implemented to support and/or otherwise provide matching capability, a particle state may be generated which comprises a position (e.g., on the electronic map, but not necessarily along a feasible trajectory line with regard to objects identified), a heading angle, a scaling and exponent factors for stride length/frequency relation, and/or the like or some combination thereof. An example particle filter may, for example, initialize a position and a heading from the trajectory, and distribute scaling and exponent around a nominal value, e.g., adjusting by an overall length of the trajectory. For a stepping action and/or at some other point in time, an example particle filter may, for example, propagate particles according to sensor measurements while allowing for small random variations of the state, and possibly effectively eliminate (e.g., discard, de-weight, etc.) particles that may be deemed to have strayed from a feasible trajectory line by a threshold measurement (e.g., 0.6 meters, etc.) and resample. In accordance with certain implementations, in an example resampling, a particle filter may selectively weigh more those particles with smaller aggregate deviations from one or more feasible trajectory lines. In accordance with certain location, in an example resampling, a particle filter may attenuate certain deviations as going further into the trajectory (e.g., having previously learned parameters). In accordance with certain implementations, a particle filter may model heading errors to be proportional to a turn amount (e.g., turning actions may be more prone to errors then non-turning actions). In accordance with certain implementations, a particle filter may maintain a history of surviving particles, which may allow for more precise subsequent trajectory and/or position estimates. In accordance with certain implementations, a particle filter may iterate in some manner to specifically focus overtime on enhancing one or more parameter values.

Attention is drawn next FIG. 11, which is a diagram 1100 illustrating a visual representation of certain objects identified in an electronic map of an indoor environment, and an overlay depicting an initial route 1102 based on initial trajectory data and a further adjusted route 1104 based on the initial trajectory data adjusted based, at least in part, on one or more of the objects identified in the electronic map, in accordance with an example implementation. As illustrated, initial route 1102 that only appears to have been affected by some drift area but also appears to present a path that is unfeasible in that it passes through certain objects (e.g., office walls, etc.) that in reality a user may not pass through. However, by implementing an example particle filter capable of providing a matching capability, not only is a drift air reduced in adjusted route 1104 but the resulting estimated trajectory which takes into account the locations of waypoints matches one or more feasible paths with regard the objects identified in the electronic map.

In accordance with certain example implementations, a discrete turn assignment algorithm and/or the like may be implemented. For example, in certain implementations a discrete turn assignment algorithm may assign waypoints in an indicated trajectory to the detected stepping actions in odometry information and/or the like to minimize a cost function. In certain implementations, a discrete turn assignment algorithm may, for example, distribute detected stepping actions within one or more segments of one or more feasible paths according to a stride model and/or the like. In accordance with certain example implementations, an example cost function may take into account an angular deviation compared to one or more previous segments, and/or a scaling/exponent change from a nominal value, average value, etc. In accordance with certain example implementations, a solution make use of dynamic programming, e.g. to possibly provide for an exact and/or more robust solution, and/or reduce complexity.

Attention is drawn next to FIGS. 12 and 13. FIG. 12 is a diagram illustrating a visual representation of a route 1200 having changing sections (represented by distances $d_1, d_2, d_3, d_4$) of a trajectory that lead through a sequence of locations of waypoints ($w_1, w_2, w_3, w_4$), taking certain turns (represented by angles $\theta_1, \theta_2, \theta_3,$ and $\theta_4$) in accordance with an example implementation. FIG. 13 is a diagram illustrating a visual representation of a route 1300 with steps taken being represented by solid circles and with certain steps being matched to locations of waypoints ($w_1, w_2, w_3, w_4$), in accordance with an example implementation.

With regard to an example routes 1200 and 1300, a discrete turn assignment algorithm may affect an estimated trajectory (e.g., to reduce drift, etc.) according to an application of discrete turn assignments. For example, as illustrated in route 1200 waypoints may be assigned to detected steps in an inertial odometry analysis in a manner that minimizes a cost function. For example, as illustrated in route 1300, detected steps may be distributed along segments of a trajectory according to a stride model. As mentioned, a cost function and/or other like model may take into account certain angular deviations compared with a previous segment and a scaling/exponent change from a nominal/average value associated with a step or stride. For example, route 1200 illustrates sets of waypoints (w) that may be represented by an angle ($\theta$) and a distance (d), and which may be matched, using the cost function, to a series of detected steps as in route 1300 represented by the encircled solid dots with labels $(w_1, w_2, w_3, w_4)$.

Thus, by way of further example, given:
1. Trajectory: a sequence of way-points, $(w_1, w_2, \ldots w_k)$, where each $w_i = <\theta_i, d_i>$ may be associated with an angle and distance;
2. Inertial odometry: a sequence of steps, $(s_1, s_2 \ldots, s_n)$, where each $s_j = <\phi_j, l_j>$ may be associated with an angle and distance.

A mapping of way-points to steps $f:(w_1, w_2, \ldots, w_k) \rightarrow (s_1, s_2, \ldots, s_n)$ may be determined to minimize the following example cost function:

$$\text{Cost}(f) = \sum_{i=1}^{k} c_{orientation}(i, f(i)) + c_{scaling}(i, f(i), f(i-1)).$$

Example component $c_{orientation}$ may represent a cost of difference in the orientation of the 'matched' trajectory to the locations of waypoints. For example, if a waypoint $w_i = <\theta_i, d_i>$ is assigned to step $s_j = <\phi_j, l_j>$, the cost could simply be $|\theta_i - \phi_j|$. However, the turns may occur gradually in the user steps and therefore the cost may not be able to be effectively computed using the orientation of a single step. Thus, in certain implementations, two compute the cost, one may take into consideration the orientation of neighboring points, e.g., using a Gaussian model and/or the like for a change in orientation at a turn.

Figure 14:
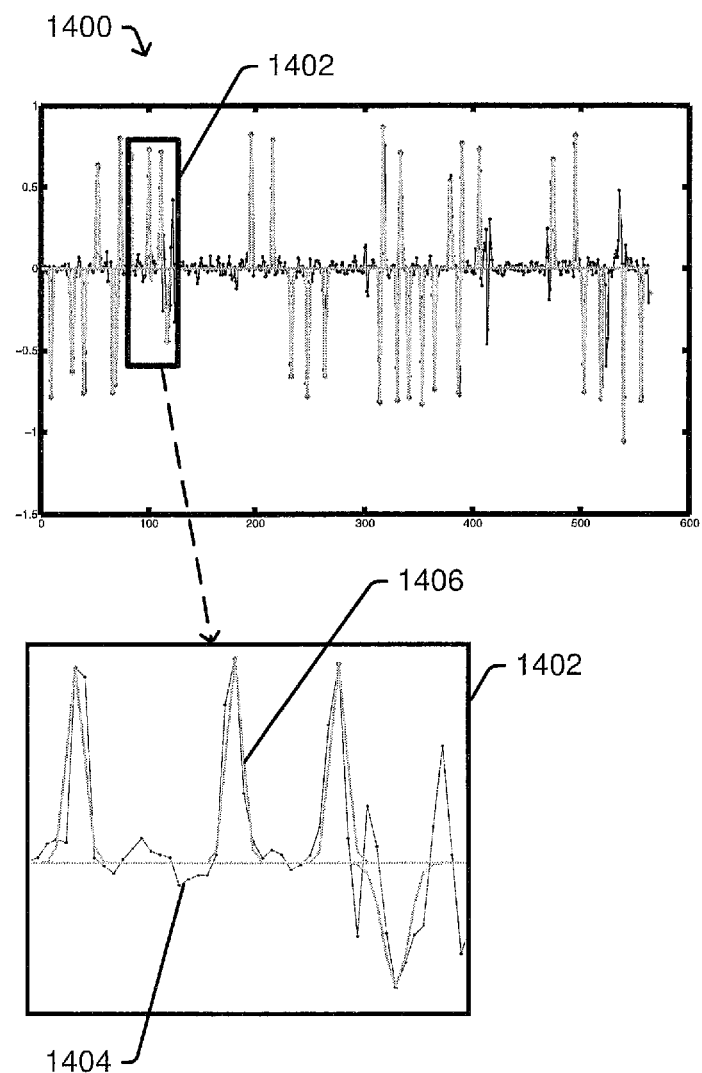
FIG. 14 is a graph and a close-up illustrating orientation data obtained from sensor measurements and fitted turn modeling information as assigned by a dynamic function, in accordance with an example implementation.

By way of an example, attention is drawn to FIG. 14, which is a graph 1400 and a close-up 1402 illustrating orientation data 1404 obtained from sensor measurements and fitted turn modeling information 1406, e.g., as may be assigned by a dynamic function and/or the like, in accordance with an example implementation. In these figures, the horizontal axis represents time in seconds and the vertical axis represents a change in orientation angle in radians.

Example component $c_{scaling}$ may, for example, represent a cost of matching (matching cost) the distance between consecutive locations of waypoints to the distance as estimated using a stride model and inertial sensor data. Thus, for example, if $w_{i-1} = <\theta_{i-1}, d_{i-1}>$ is assigned to $s_j = <\phi_j, l_j>$ and $w_i = <\phi_i, d_i>$ is assigned to $s_k = <\phi_k, l_k>$, then $$c_{scaling}(i, j, k) = \left(1 - \frac{d_i}{\sum_{j+1}^{k} l_m}\right)^2, \text{ and}$$

$$\text{Cost}(f) = \sum_{i=1}^{k} c_{orientation}(i, f(i)) + c_{scaling}(i, f(i), f(i-1)).$$

As such, in certain example implementations a solution may be computed using a dynamic function and/or the like by exploiting the optimal substructure, e.g., as follows:

$$C(i, j) = \min_{k}(c_{orientation}(i, k) + c_{scaling}(i, k, j) + C(i+1, k+1))$$

where $C(i, j)$ is the minimum cost of matching $(w_i, w_{i+1}, \ldots w_k)$ to $(s_j, s_{j+1}, \ldots s_n)$.

Figure 15:
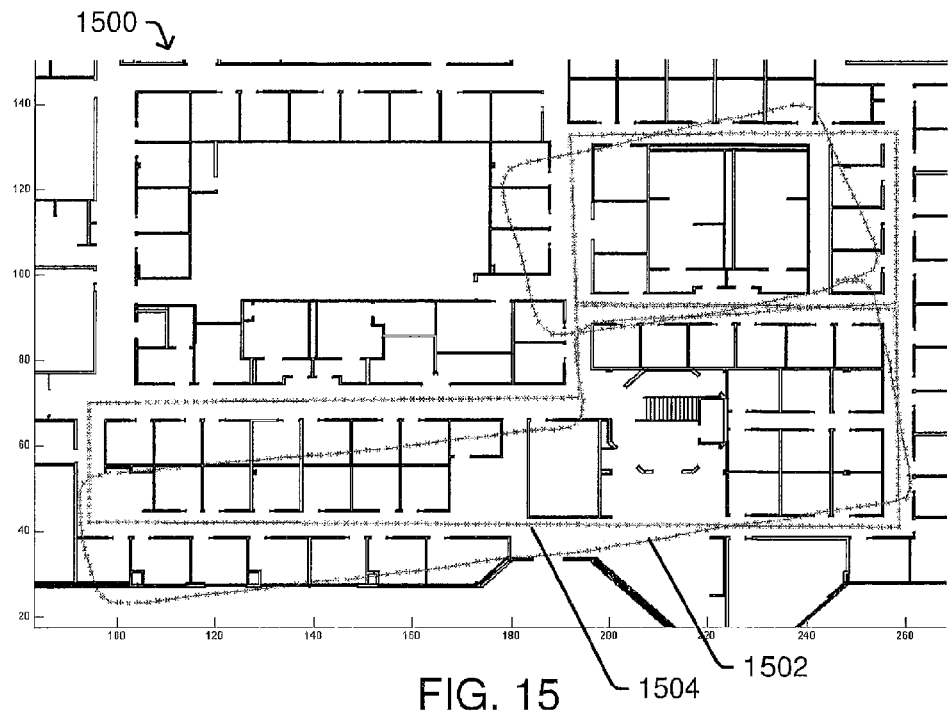
FIGS. 15 and 16 are diagrams illustrating some additional example indoor environments, and overlays depicting certain initial routes and corresponding adjusted routes, in accordance with certain example implementations.
Figure 16:
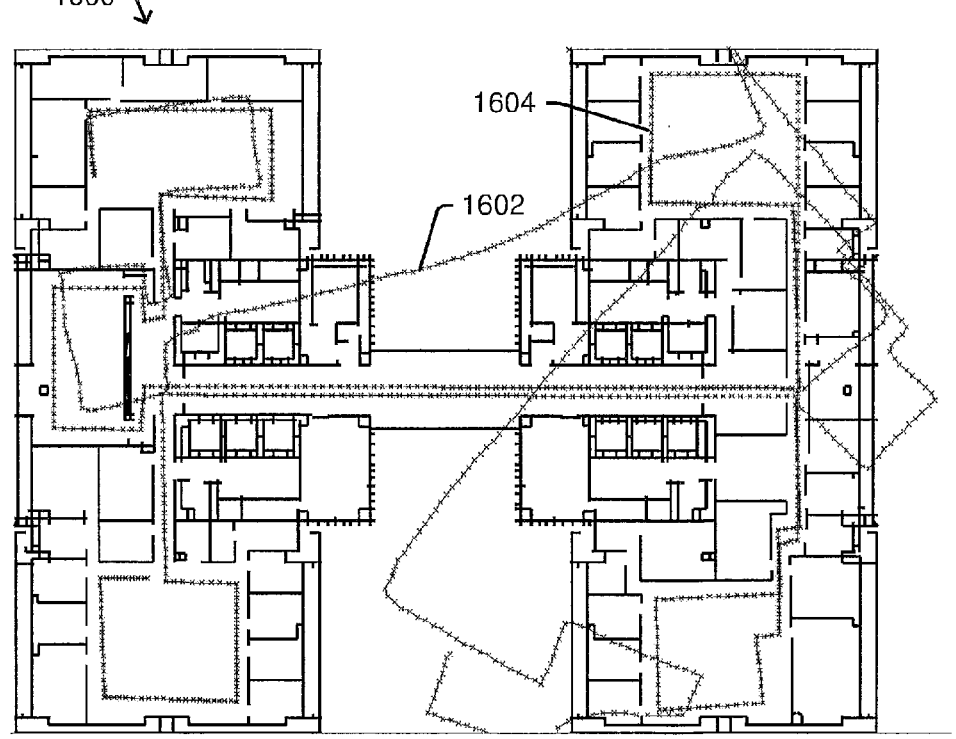

By way of further example, FIGS. 15 and 16 present example diagrams 1500 and 1600, respectively, illustrating some additional example indoor environments, with overlays depicting certain initial routes (1502 and 1602), and corresponding adjusted routes (1504 and 1604), in accordance with certain example implementations as a result of implementation of an example discrete turn assignment algorithm having a cost function that is minimized using a dynamic function. As illustrated, only the adjusted routes 1504 and 1604 present continuously feasible paths with regard to the various objects illustrated in the example indoor environment.

In accordance with certain further example implementations, certain matching capabilities may be provided that may not make use of the locations of waypoints. Here, for example, a particle filter and/or the like may not necessarily need to take into consideration explicit waypoints, running instead based on information provided in electronic map. In certain instances, for example, a dynamic programming solution may assume one or more waypoints, and/or a sequence of waypoints based, at least in part, on one or more feasible paths with regard to a user's ability to navigate within an indoor environment, e.g., with regard to certain objects identified in an electronic map. In certain example instances, one or more such waypoints may also take into consideration, and/or otherwise be selected, based, at least in part, on an estimated stride length, an estimated stride frequency, an estimated velocity, and/or the like or some combination thereof associated with a user. In certain implementations, turn constraints and/or other like information relative to locations in the electronic map (and corresponding to actual locations in the indoor environment) may, for example, be used, at least in part, to remove or de-weight, or otherwise identify trajectories and/or feasible paths that may be deemed incorrect given the situation.

In accordance with certain aspects, such a map-based feasible path and waypoint selection techniques may be of particular value and benefit for indoor environments having highly constrained locales, e.g. office buildings. Indeed, such techniques may be specifically optimize for performance and/or accuracy with regard to a particular electronic map type, structure type, floor plan, user, mobile device, sensor, computing platform, etc. In certain instances, all or part of such techniques may be performed in a preprocessing operation. Here for example, in certain implementations and electronic map may be preprocessed in such a way as to generate a corresponding, and/or special purpose, routing graph and/or the like which may be indicative of certain feasible paths and/or locations of certain common or otherwise expected waypoints.

In accordance with certain example implementations, a computing platform may be provided to implement a real-time matching capability, e.g., using a particle filter and/or the like with recently generated sensor measurements. In certain example implementations, provided adequate processing capability, it may be possible for a dynamic programming approach to be implemented in real time.

In accordance with certain aspects, a computing platform may provide post-positioning using sensor based odometry and electronic map information and/or other defined waypoints. As presented herein, in certain example implementations, dynamic programming based turn-assignment algorithm(s) may be implemented, at least in part, to match locations of waypoints and/or other like information associated with electronic map of an indoor environment to inertial sensor odometry, environmental sensor odometry, and/or the like or some combination thereof. As presented herein, in certain example implementations, a particle filter and/or the like, and/or other like algorithm may be implemented, at least in part, to possibly promote better trajectory and/or position estimates, reduce errors such as drift errors, and/or possibly to take into account stride scaling factors, and/or other like information. It should be understood that in certain implementations, one or more sensor measurements may be obtained by the mobile device and stored for later use, such as, e.g., comparison to an electronic map to determine trajectory, etc. Such sensor measurements may, for example, be used within the mobile device and/or communicated to one or more other computing platforms for various uses, such as, e.g., supporting one or more positioning/navigation capabilities of the mobile device, generating and/or updating all or part of one or more electronic maps, etc.

In accordance with certain further aspects, a computing platform may provide more of a real-time positioning capability, e.g., using sensor measurement based odometry and/or the like, along with certain electronic map information and/or predefined locations of waypoints, etc. In certain implementations, a particle filter and/or the like may, for example, be implemented to estimate a trajectory and/or position of a mobile device by enforcing certain electronic map and/or waypoint constraints. In certain implementations, a dynamic programming solution may, for example, be implemented to explore a plurality of feasible paths within an electronic map in support of estimating a trajectory and/or position of a mobile device.

Accordingly, in accordance with certain aspects, the techniques provided herein may allow for a plurality of potential paths—all potential paths in some embodiments—within an indoor environment to be considered in determining estimated trajectory based on one or more sensor measurements obtained on board the mobile device. Moreover, the estimated trajectory may, at times, comprise and/or result from errors associated, at least in part, with the one or more sensor measurements. However, the effect of such errors may be reduced by affecting the estimated trajectory based at least in part on one or more objects identified in an electronic map of the indoor environment. Thus, for example as pointed out herein, in certain implementations drift 250 may be corrected, at least in part, or otherwise taken into consideration as the estimated trajectory of the mobile device is affected based on the electronic map. Accordingly, a trajectory and/or condition of mobile device may be estimated without the use of signal-based positioning techniques, which may not always be available.

In accordance with certain aspects, a computing platform may provide a combination of real-time positioning and/or post-positioning capabilities. In certain implementations, such capabilities may be distributed amongst a plurality of devices, and/or performed within a single device having one or more computing platforms. In accordance with certain example implementations, the techniques provided herein that estimate trajectories and/or positions of mobile devices within an indoor environment based on sensor measurements and electronic map information may be implemented without the use and/or consideration of any signal-based positioning signals.

The methodologies described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining", "establishing", "obtaining", "identifying", "applying," and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics.

Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, with at least one computing platform:
    estimating a trajectory of a mobile device within an indoor environment based, at least in part, on one or more sensor measurements obtained at said mobile device;
    obtaining at least one of one or more locations of one or more waypoints based, at least in part, on at least one input received from a user interface of said mobile device, said locations of said one or more waypoints being defined based, at least in part, on one or more objects identified in an electronic map of said indoor environment; and
    affecting said estimated trajectory based, at least in part, on said one or more locations of said one or more waypoints.

2. The method as recited in claim 1, wherein said estimating said trajectory further comprises:
    detecting an occurrence of at least one action associated with a motion mode based, at least in part, on at least one of said one or more sensor measurements obtained from at least one accelerometer at said mobile device; and
    based, at least in part, on said occurrence of said at least one action, estimating at least one of: a distance traveled by said mobile device during a period of time; or a velocity of said mobile device during said period of time.

3. The method as recited in claim 2, wherein said motion mode comprises a bipedal movement mode, said at least one action comprises at least one stepping action, and further comprising:
    estimating at least one of: said distance traveled; or said velocity, based, at least in part, on at least one of: an estimated stride length; or an estimated stride frequency, of said at least one stepping action.

4. The method as recited in claim 3, wherein estimating at least one of: said distance traveled; or said velocity further comprises:
    integrating a step count.

5. The method as recited in claim 1, wherein said estimating said trajectory further comprises:
    determining whether a change in an orientation of said mobile device has or has not occurred based, at least in part, on at least one of said one or more sensor measurements obtained from at least one of: a gyroscope at said mobile device; or a magnetometer at said mobile device; and
    estimating a current heading of said mobile device based, at least in part, on said determination of whether said change in said orientation has or has not occurred.

6. The method as recited in claim 5, wherein said estimating said current heading of said mobile device further comprises:
    estimating said current heading of said mobile device based, at least in part, on at least one previously estimated heading.

7. The method as recited in claim 1, and further comprising, with said at least one computing platform:
    determining at least one of said one or more locations of said one or more waypoints based, at least in part, on said electronic map.

8. The method as recited in claim 1, wherein said affecting said estimated trajectory further comprises:
    correcting a drift in said estimated trajectory, at least in part, using a particle filter.

9. The method as recited in claim 8, wherein said particle filter maintains a particle state based, at least in part, on at least one of: an estimated position of said mobile device on said electronic map; an estimated heading of said mobile device; an estimated distance traveled by said mobile device during a period of time; or an estimated velocity of said mobile device during said period of time.

10. The method as recited in claim 9, wherein said estimated heading is associated with a heading error that is based, at least in part, on an estimated turn characteristic.

11. The method as recited in claim 8, wherein said particle filter maintains a particle state based, at least in part, on deleting propagated particles that stray from said estimated trajectory by more than a threshold measurement.

12. The method as recited in claim 8, wherein said particle filter propagates particles based, at least in part, on at least one of said one or more sensor measurements obtained at said mobile device.

13. The method as recited in claim 1, wherein said affecting said estimated trajectory further comprises:
    correcting a drift in said estimated trajectory, at least in part, using a discrete turn assignment that is based, at least in part, on a cost function.

14. The method as recited in claim 13, wherein said cost function takes into account at least one of: a cost corresponding to a difference in an orientation of said mobile device compared to said estimated trajectory during a period of time; or a cost corresponding to a distance between consecutive waypoints on said estimated trajectory to an estimated distance traveled by said mobile device during said period of time.

15. The method as recited in claim 13, wherein said cost function is computed using a dynamic function to minimize a matching cost.

16. The method as recited in claim 1, wherein said at least one computing platform is provided in said mobile device.

17. The method as recited in claim 16, and further comprising, with said at least one computing platform:
    estimating a location of said mobile device based, at least in part, on said estimated trajectory and said electronic map.

18. The method as recited in claim 17, and further comprising, with said at least one computing platform:
    initiating presentation of said estimated location of said mobile device via at least one user output device of said mobile device.

19. The method as recited in claim 1, wherein said estimating comprises estimating said trajectory from a plurality of potential trajectories in said indoor environment based, at least in part, on said electronic map of said indoor environment.

20. The method as recited in claim 1, wherein the estimating comprises estimating the trajectory of the mobile device without the use of any signal based positioning information.

21. The method of claim 1, wherein obtaining the at least one of said one or more locations of waypoints further comprises accepting user inputs with regarding to a display of information within a displayed rendering of said electronic map.

22. The method of claim 1, wherein the at least one input is provided in response to presentation of a list of people, points of interest or a visual representation of all or a portion of a floor plan.

23. The method of claim 1, and further comprising accepting said at least one input by way of a touchscreen, keypad, microphone or camera.

24. An apparatus comprising:
means for estimating a trajectory of a mobile device within an indoor environment based, at least in part, on one or more sensor measurements obtained at said mobile device;
means for obtaining at least one of one or more locations of one or more waypoints based, at least in part, on at least one input received from a user interface of said mobile device, said locations of said one or more waypoints being defined based, at least in part, on one or more objects identified in an electronic map of said indoor environment; and
means for affecting said estimated trajectory based, at least in part, on said one or more locations of said one or more waypoints.

25. A computing platform comprising:
memory; and
one or more processing units to:
estimate a trajectory of a mobile device within an indoor environment based, at least in part, on one or more sensor measurements obtained at said mobile device;
obtain at least one of one or more locations of one or more waypoints based, at least in part, on at least one input received from a user interface of said mobile device, said locations of said one or more waypoints being defined based, at least in part, on one or more objects identified in an electronic map of said indoor environment accessible via said memory; and
affect said estimated trajectory based, at least in part, on said one or more locations of said one or more waypoints.

26. The computing platform as recited in claim 25, said one or more processing units to further:
detect an occurrence of at least one action associated with a motion mode based, at least in part, on at least one of said one or more sensor measurements obtained from at least one accelerometer at said mobile device; and
based, at least in part, on said occurrence of said at least one action, estimate at least one of: a distance traveled by said mobile device during a period of time; or a velocity of said mobile device during said period of time.

27. The computing platform as recited in claim 26, wherein said motion mode comprises a bipedal movement mode, said at least one action comprises at least one stepping action, and said one or more processing units to further:
estimate at least one of: said distance traveled; or said velocity, based, at least in part, on at least one of: an estimated stride length; or an estimated stride frequency, of said at least one stepping action.

28. The computing platform as recited in claim 27, said one or more processing units to further estimate at least one of: said distance traveled; or said velocity by further:
integrating a step count.

29. The computing platform as recited in claim 25, said one or more processing units to further:
determine whether a change in an orientation of said mobile device has or has not occurred based, at least in part, on at least one of said one or more sensor measurements obtained from at least one of: a gyroscope at said mobile device; or a magnetometer at said mobile device; and
estimate a current heading of said mobile device based, at least in part, on said determination of whether said change in said orientation has or has not occurred.

30. The computing platform as recited in claim 29, said one or more processing units to further:
estimate said current heading of said mobile device based, at least in part, on at least one previously estimated heading.

31. The computing platform as recited in claim 25, said one or more processing units to further affect said estimated trajectory, based at least in part, by correcting a drift in said estimated trajectory, at least in part, using a particle filter.

32. The computing platform as recited in claim 31, wherein said particle filter maintains a particle state based, at least in part, on at least one of: an estimated position of said mobile device on said electronic map; an estimated heading of said mobile device; an estimated distance traveled by said mobile device during a period of time; or an estimated velocity of said mobile device during said period of time.

33. The computing platform as recited in claim 32, wherein said estimated heading is associated with a heading error that is based, at least in part, on an estimated turn characteristic.

34. The computing platform as recited in claim 31, wherein said particle filter maintains a particle state based, at least in part, on deleting propagated particles that stray from said estimated trajectory by more than a threshold measurement.

35. The computing platform as recited in claim 31, wherein said particle filter propagates particles based, at least in part, on at least one of said one or more sensor measurements obtained at said mobile device.

36. The computing platform as recited in claim 25 said one or more processing units to affect said estimated trajectory, at least in part, by correcting a drift in said estimated trajectory, at least in part, using a discrete turn assignment that is based, at least in part, on a cost function.

37. The computing platform as recited in claim 36, wherein said cost function takes into account at least one of: a cost corresponding to a difference in an orientation of said mobile device compared to said estimated trajectory during said period of time; or a cost corresponding to a distance between consecutive waypoints on said estimated trajectory to said estimated distance traveled by said mobile device during said period of time.

38. The computing platform as recited in claim 36, wherein said cost function is computed using a dynamic function to minimize a matching cost.

39. The computing platform as recited in claim 25, wherein said computing platform is provided in said mobile device.

40. The computing platform as recited in claim 39, said one or more processing units to further:
estimate a location of said mobile device based, at least in part, on said estimated trajectory and said electronic map.

41. The computing platform as recited in claim 40, wherein said mobile device further comprises at least one user output device, and said one or more processing units to further initiate presentation of said estimated location of said mobile device via said at least one user output device.

42. A non-transitory computer readable medium having stored thereon computer implementable instructions executable by one or more processing units in a computing platform to:
- estimate a trajectory of a mobile device within an indoor environment based, at least in part, on one or more sensor measurements obtained at said mobile device;
- obtain at least one of one or more locations of one or more waypoints based, at least in part, on at least one input received from a user interface of said mobile device, said locations of said one or more waypoints being defined based, at least in part, on one or more objects identified in an electronic map of said indoor environment accessible via a memory; and
- affect said estimated trajectory based, at least in part, on said one or more locations of said one or more waypoints.

* * * * *